(12) United States Patent
Miller et al.

(10) Patent No.: US 6,924,935 B2
(45) Date of Patent: Aug. 2, 2005

(54) COMPACT MULTIPLE APERTURE IMAGING ARRAY

(75) Inventors: Brian R. Miller, Fair Haven, NY (US); Robert D. Fiete, Fairport, NY (US); Theodore A. Tantalo, Rochester, NY (US); Kenneth L. Mason, Pittsford, NY (US); Frederick J. Warner, Rochester, NY (US); Frank J. Tantalo, Rochester, NY (US); Taryn A. Czajka, Rochester, NY (US)

(73) Assignee: ITT Manufacturing Enterprises Inc., Wilmington, DE (US)

( * ) Notice: Subject to any disclaimer, the term of this patent is extended or adjusted under 35 U.S.C. 154(b) by 0 days.

(21) Appl. No.: 10/692,170

(22) Filed: Oct. 23, 2003

(65) Prior Publication Data

US 2005/0088752 A1 Apr. 28, 2005

(51) Int. Cl.[7] .............................................. G02B 27/10
(52) U.S. Cl. ....................... 359/621; 359/618; 359/619; 359/620; 359/626
(58) Field of Search ................................ 359/618–621, 359/626

(56) References Cited

U.S. PATENT DOCUMENTS

| 5,905,591 A | 5/1999 | Duncan et al. ............. 359/349 |
| 5,919,128 A | 7/1999 | Fitch ........................... 600/166 |
| 6,381,072 B1 * | 4/2002 | Burger ........................ 359/622 |

FOREIGN PATENT DOCUMENTS

EP        1 079 613 A2      2/2001

OTHER PUBLICATIONS

Joseph W. Goodman, *Introduction to Fourier Optics*, McGraw–Hill Electrical and Computer Engineering Series, second edition, 1996, pp. 134–144.

* cited by examiner

*Primary Examiner*—Hung Xuan Dang
*Assistant Examiner*—Joseph Martinez
(74) *Attorney, Agent, or Firm*—RatnerPrestia

(57) ABSTRACT

In a method and system for imaging using multiple apertures, the present invention uses an array of lens elements to form the aperture for a high resolution imaging system. The light from each lens element is properly phased and reduced in volume to form a compact imaging system that captures images with higher resolution possible with each individual element, potentially the resolution will correspond to an aperture equivalent to the size of the lens array.

18 Claims, 7 Drawing Sheets

COMPACT MULTIPLE APERTURE IMAGING ARRAY

FIELD OF THE INVENTION

The invention relates generally to a method of using an array of lens elements to capture images. More specifically, the invention relates to a method of reducing the volume of the light captured by an array of lens elements and combining the image information from the lens elements to form an image with a higher resolution than possible with an image captured from a single lens element.

BACKGROUND OF THE INVENTION

Conventional imaging systems, such as photographic cameras and video cameras, can be reduced in size by miniaturizing the components that comprise the imaging systems. This method of constructing smaller and more compact imaging systems is inherently limited by the capability of manufacturing and assembling smaller components. In general, as imaging systems are reduced in size, the resolving capability of the imaging systems are also reduced.

Resolution determines the highest amount of image detail that can be captured in a scene and is fundamentally limited by the aperture size of the optical system (see *Introduction to Fourier Optics* by Joseph W. Goodman, McGraw-Hill Electrical and Computer Engineering Series, second edition, 1996, pp. 134–144). One calculation of resolution relates the aperture size to the highest nonzero spatial frequency of the modulation transfer function (MTF). An imaging system with a smaller aperture size, therefore, will capture images at lower resolution than an imaging system with a larger aperture size.

European Patent Application No. 1 079 613, by Jun Tanida et al. filed Aug. 18, 2000, titled "IMAGE INPUT APPARATUS" uses an array of lenses to form a compact imaging system. The method of Tanida et al. uses a partitioned wall layer between the array of lenses and a photosensitive element array to form an image. The resolution of the images collected by Tanida et al. is limited to the size of the individual lenses because Tanida et al. do not disclose a method of relaying all of the light captured by the array of lenses onto one photosensitive element.

A plurality of imaging elements can be combined in geometrical patterns to form a larger aperture that can capture an image with a higher resolution than possible with an image captured from a single imaging element. Multiple aperture system concepts, that coherently combine the light collected from a plurality of apertures to form a higher resolution image, have been disclosed in prior art. U.S. Pat. No. 5,905,591, issued May 18, 1999, to Alan L. Duncan et al., titled "MULTI-APERTURE IMAGING SYSTEM," uses multiple telescopes to synthesize a larger aperture for a space-based deployable imaging system. In another example, U.S. Pat. No. 5,919,128, issued Jul. 6, 1999, to Joseph P. Fitch, titled "SPARSE APERTURE ENDOSCOPE," combines fiber optic light pipes to form an endoscope.

There is a need, therefore, for a compact imaging system using a plurality of apertures that can potentially capture an image resolution comparable to that of a large single aperture.

SUMMARY OF THE INVENTION

The aforementioned need is met, according to the present invention, by providing a multiple aperture imaging system, that includes: an array of lens elements for capturing light; a means for adjusting the optical phase of the light, a means for reducing the area of the exiting light bundles from the lens elements, and a means for combing the captured light within the array of lens elements to form an image.

ADVANTAGEOUS EFFECT OF THE INVENTION

This invention uses an array of lens elements to form a compact imaging system that produces an image with higher resolution than possible from any individual lens element within the array of lens elements.

BRIEF DESCRIPTION OF THE DRAWINGS

The above and other objects, features, and advantages of the present invention will become more apparent when taken in conjunction with the following description and drawings.

To facilitate understanding, identical reference numerals have been used, where possible, to designate identical elements that are common to the figures.

DETAILED DESCRIPTION OF THE INVENTION

In a method for imaging using multiple apertures, the present invention employs an array of lens elements, a means for adjusting the optical phase of the light, a means for reducing the area of the light bundles exiting the lens elements, and a means for combing the captured light within the array of lens elements to form an image. The information collected by each lens element can be combined to form an image with higher resolution than possible with any individual lens element within the multiple aperture imaging system. Potentially the resolution will correspond to an aperture the size of the entire lens array.

Figure 1A:
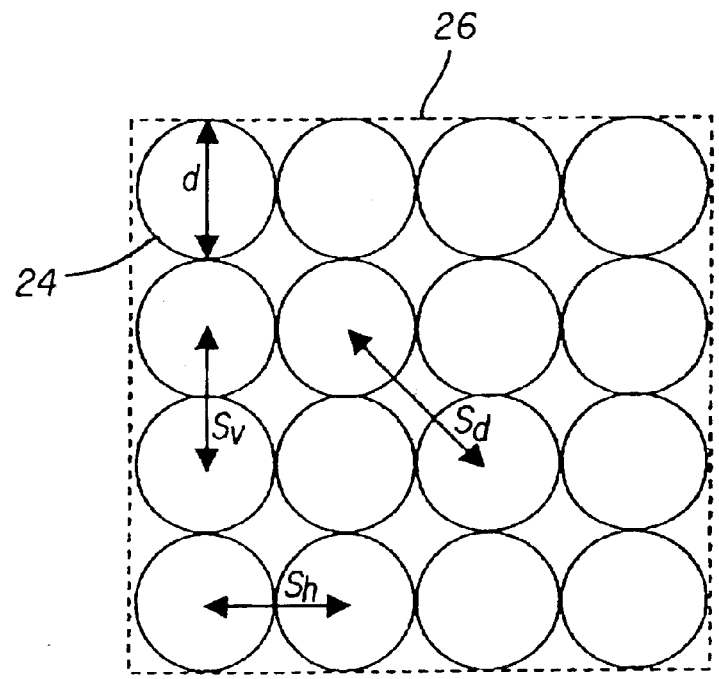
FIG. 1a is a schematic diagram illustrating a system that square-packs sixteen lens elements with circular apertures to form a square array.
Figure 1B:
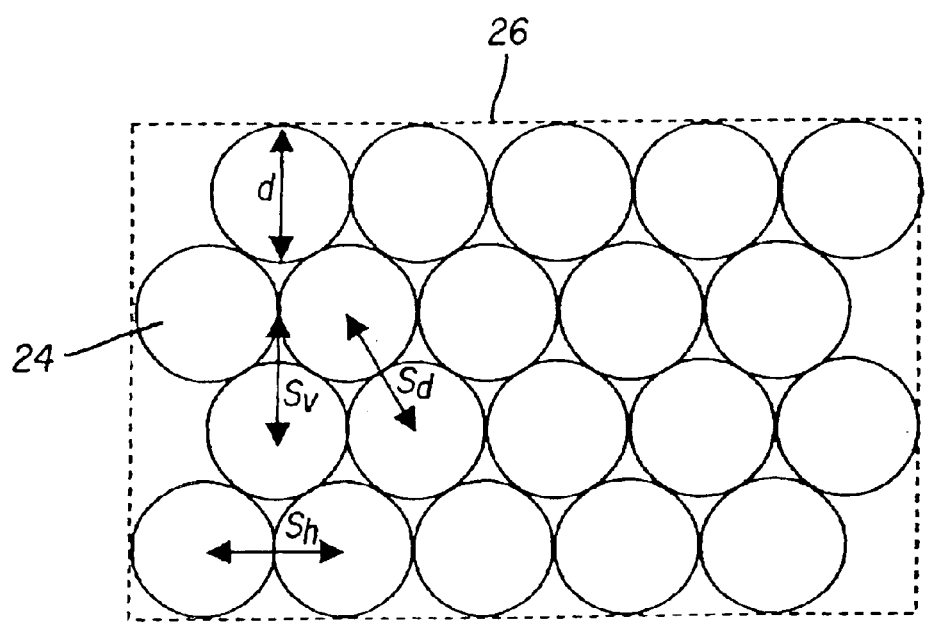
FIG. 1b is a schematic diagram illustrating a system that hexagonally-packs twenty lens elements with circular apertures to form a rectangular array.
Figure 1C:
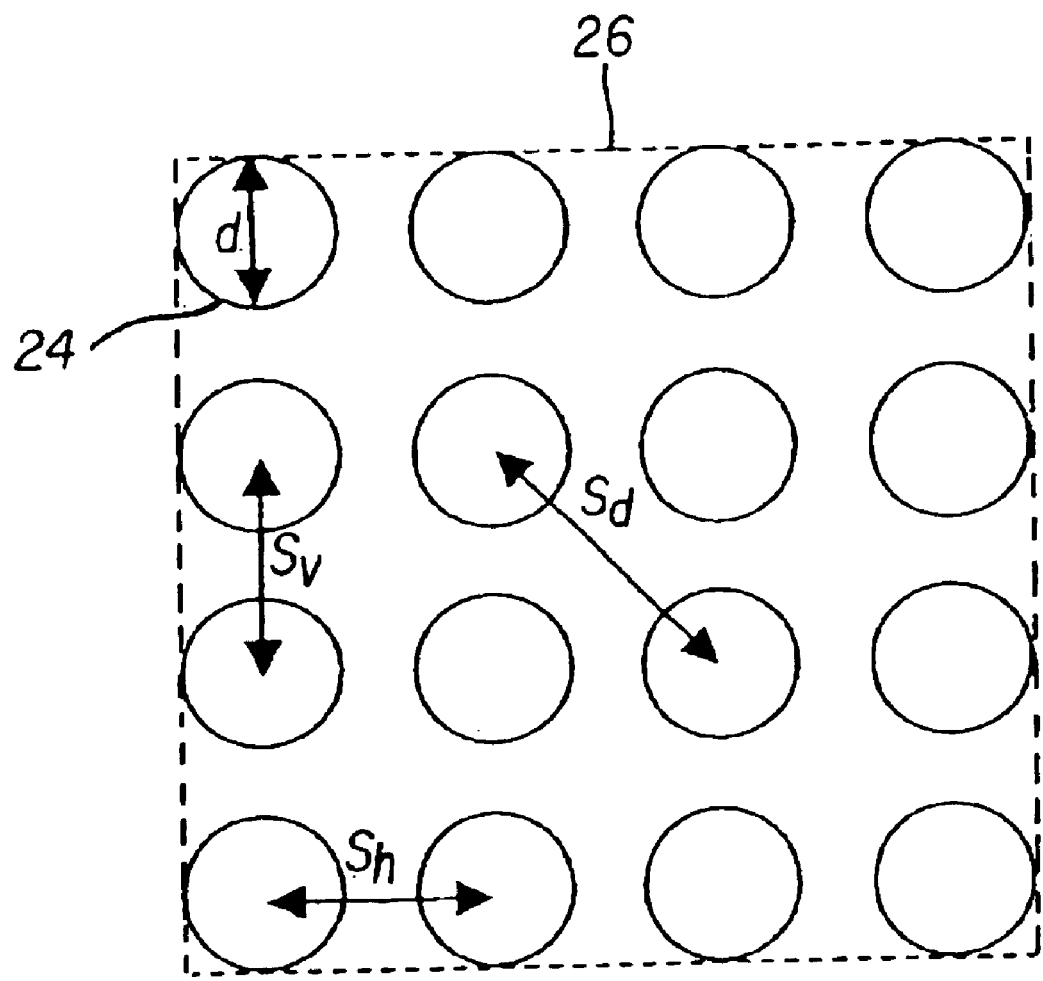
FIG. 1c is a schematic diagram illustrating a system that square-packs sixteen lens elements with circular apertures to form a sparse square array.

Referring to one embodiment illustrated in FIG. 1a, a plurality of lens elements 24 are arranged to form a array of lens elements 26 Each lens element has an aperture with width d, and the adjacent horizontal lens elements are separated by a center-to-center separation distance $s_h$, the adjacent vertical lens elements are separated by a center-to-center separation distance $s_v$, and the adjacent diagonal lens elements are separated by a center-to-center separation distance $S_d$. The array 26 of lens elements 24 can be arranged to form different array geometries and it is understood that the present invention need not be limited to an array of lens elements in a square or rectangular configuration, e.g., circular, elliptical, or hexagonal arrangement of lens elements 24 will also suffice. The lens elements 24 can also be packed together in different configurations other than square or hexagonal, including circular, elliptical, or non-redundant configurations. FIG. 1a illustrates one embodiment that square-packs sixteen lens elements 24 with circular apertures to form a square array 26 of lens elements 24. FIG. 1b illustrates another embodiment that hexagonally-packs twenty lens elements 24 with circular apertures to form a rectangular array 26 of lens elements 24. In another embodiment, shown in FIG. 1c, the lens elements 24 are separated further apart to form a sparse aperture square array 26 of lens elements 24. It should be noted that if $2d<s_h$, $2d<s_v$, or $2d<s_d$, then the image quality may not be desirable due to a poor MTF. Other embodiments with non-uniform aperture sizes as well as non-uniform spacing between the apertures could also be considered. Other lens aperture geometries, other than circular, such as elliptical or rectangular aperture shapes, could also be considered. It should also be noted that a plurality of mirror elements could be used in conjunction with or instead of the plurality of lens elements 24.

Referring to the embodiment illustrated in FIG. 1a, the sixteen apertures are square-packed to form an array 26 using four lens elements 24 each in the horizontal and vertical directions, such that there are no gaps between the lens elements 24 in the horizontal and vertical directions; hence $s_h=s_v=d$. The diffraction-limited resolution of each lens element 24 is proportional to the diameter d; but if the electromagnetic wavefront propagating from each lens element 24 is coherently combined, then a higher resolution can be captured, as if collected by a single larger square aperture equal to the size of the array 26. For the 4×4 array 26 of lens elements 24 in FIG. 1a, a resolution corresponding to an aperture size of [4d]×[4d] can be captured. For an arbitrary $[N_h]\times[N_v]$ rectangular array 26 of square-packed lens elements 24, where $N_h$ is the number of lens element apertures in the horizontal direction and $N_v$ is the number of lens element apertures in the vertical direction, a higher resolution can be captured corresponding to a rectangular aperture with a horizontal length of $(N-1)s_h+d$ and a vertical width of $(N-1)s_v+d$.

Figure 2:
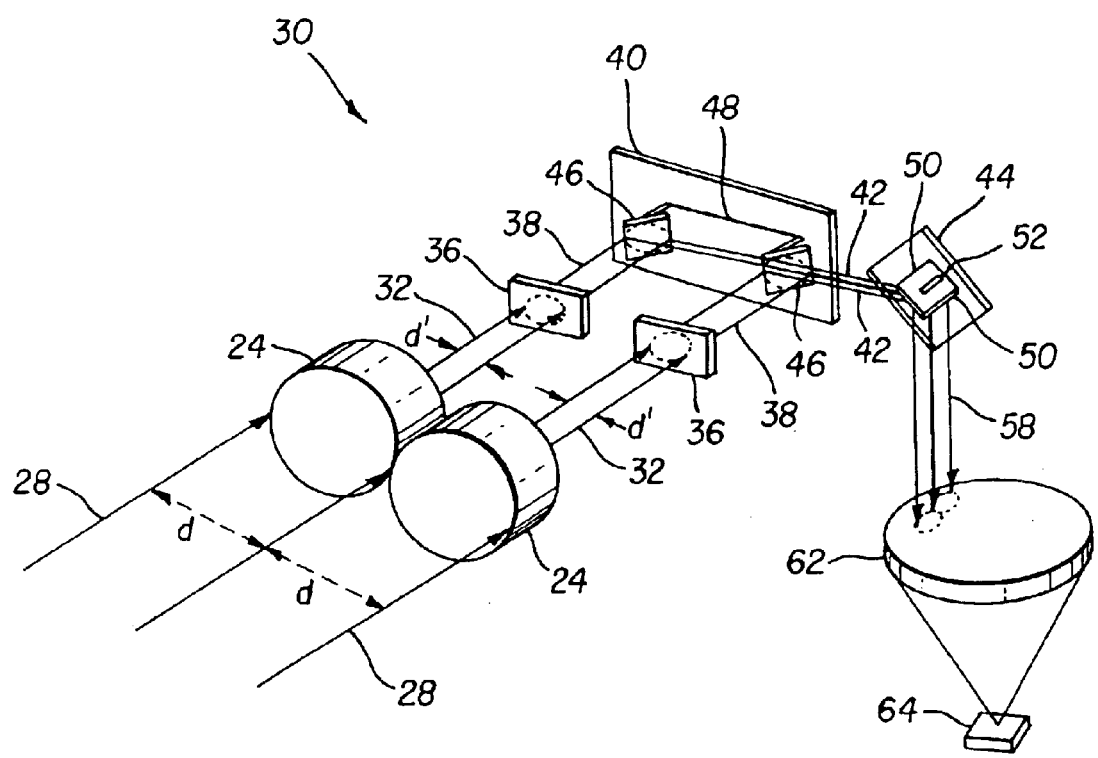
FIG. 2 is a perspective view of the light path through two adjacent lens elements.
Figure 3:
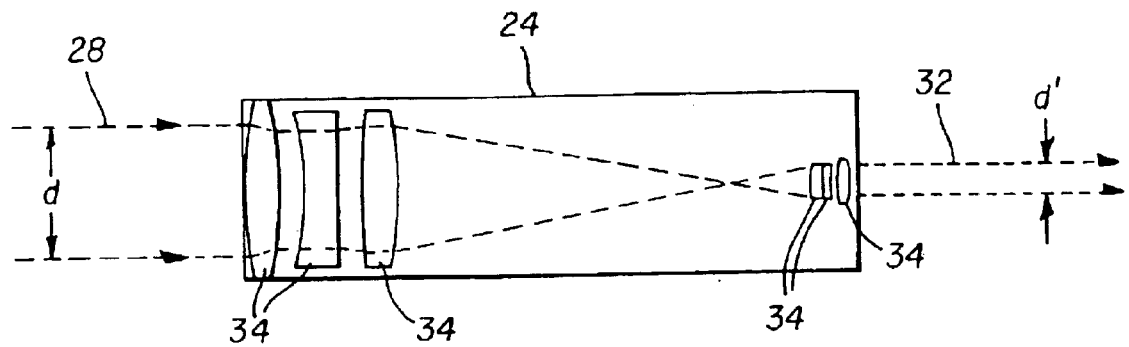
FIG. 3 is a schematic diagram illustrating one embodiment of the lens element design.

FIG. 2 is a perspective view of the light path through two adjacent apertures in one embodiment of the present invention. Incoming light 28 enters the lens elements 24 of the imaging system 30. Each lens element 24 reduces the diameter of the exiting light 32 from each lens element 24 such that the diameter d' of the exiting light 32 is smaller than lens element 24 aperture size d. One embodiment of the lens elements 24 using a plurality of lenses 34 to reduce the diameter of the exiting light bundles is schematically illustrated in FIG. 3. In this embodiment, six lenses 34 are used to reduce the scale of the exiting light 32 by a factor of 5×.

Referring to FIG. 2, the light 32 exiting each lens element 24 must travel the same optical path length so that the light 32 from each lens element 24 is in phase when imaged by the detector 64. A phase corrector 36 corresponding to each lens element 24 is implemented to correct the phase differences between the light 32 from each lens element 24. It is understood that the phase correction can be performed at any point along the light path before reaching the detector 64. Phase correction techniques are well established in the art and can be comprised of reflective or transmissive optical elements. In one embodiment, the phase corrector 36 is an optical delay line. In another embodiment, the phase corrector 36 consists of non-linear voltage activated transmissive optics (controlled via a sensor feedback loop) that alter the optical path length of the light 32. The phase corrector 36 may also be required to correct optical aberrations and misalignments that may exist for the lens elements 24. An Optical Volumetric Reducing Process (OVRP) is implemented to reduce the exiting light bundles 32 from the lens elements 24 into an area much smaller than the size of the array 26. In one embodiment of the present invention, the OVRP is a two-step process that compacts the exiting light bundles 32 from the lens elements 24 in the horizontal direction and the vertical direction. The light 38 is first passed through the horizontal OVRP 40, then the light bundles 42 exiting the horizontal OVRP 40 are passed through the vertical OVRP 44. It is understood that in another embodiment of the present invention the vertical OVRP 44 can precede the horizontal OVRP 40. The horizontal OVRP 40 uses optical elements 46 held by support structure 48 to reduce the length of the exiting bundles in the horizontal direction. The vertical OVRP 44 uses optical elements 50 helped by support structure 52 to reduce the length of the exiting bundles in the vertical direction.

Figure 4A:
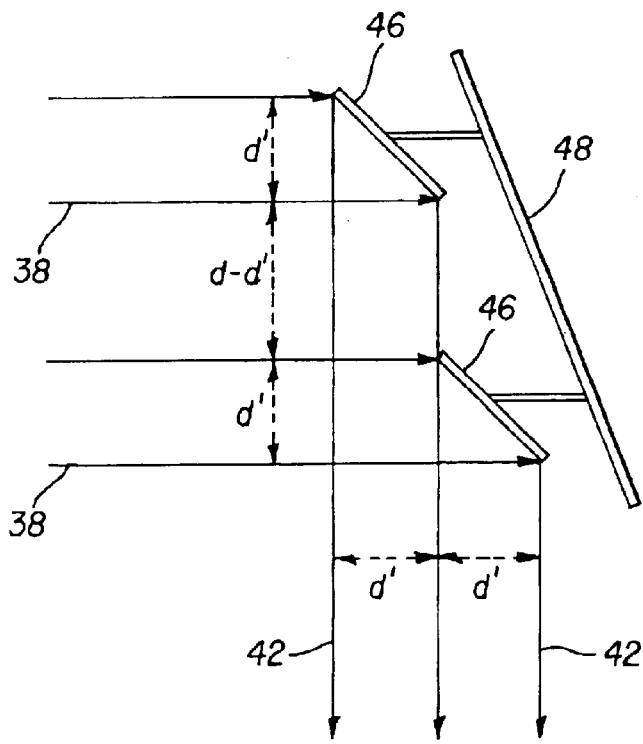
FIG. 4a is a schematic diagram illustrating the positioning of two neighboring optical elements in the horizontal OVRP to reduce the area covering the exiting light bundles.
Figure 4B:
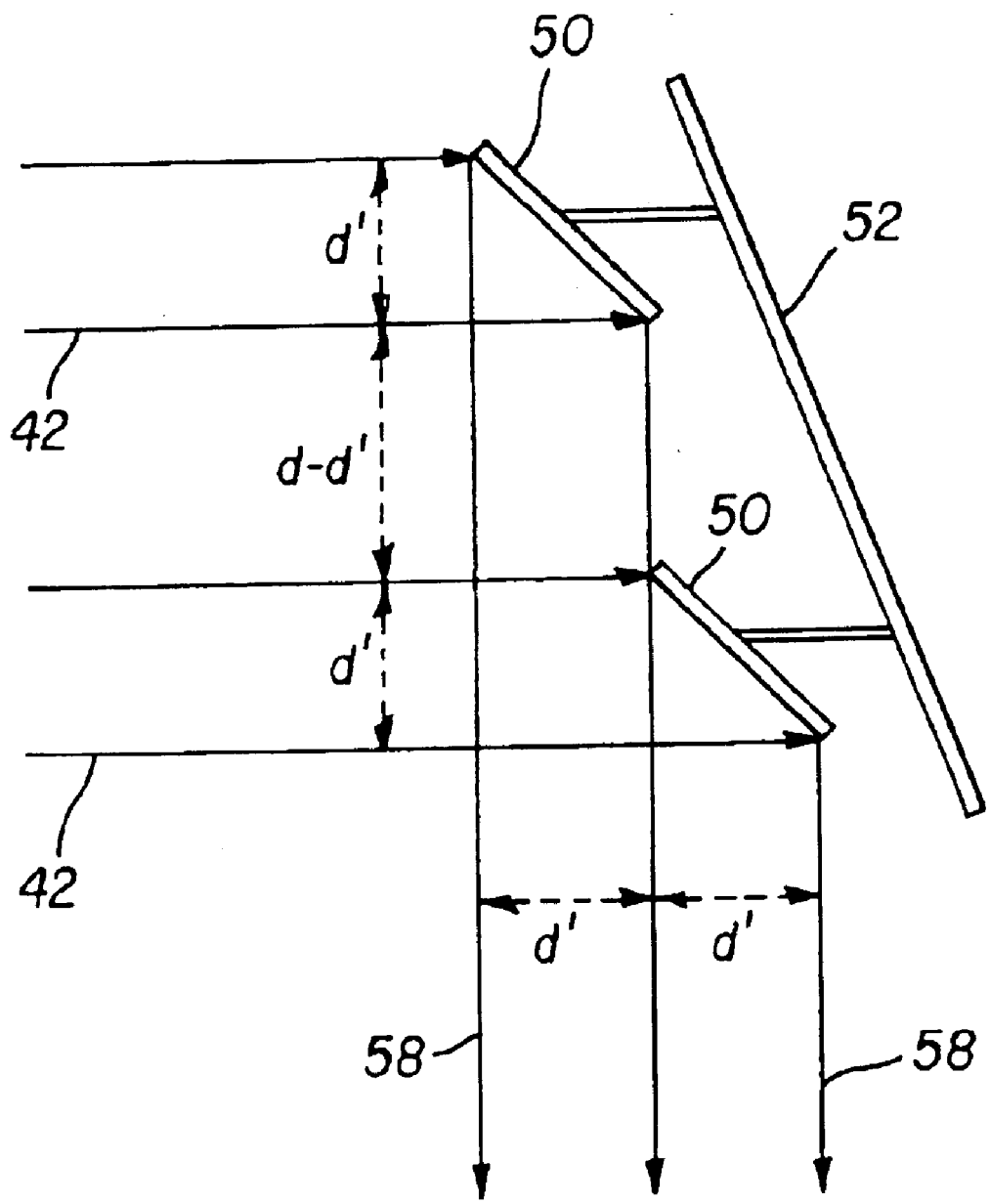
FIG. 4b is a schematic diagram illustrating the positioning of two neighboring optical elements in the vertical OVRP to reduce the horizontal dimension.

FIG. 4a illustrates a top view of the positioning of two neighboring optical elements 46 in the horizontal OVRP 40 to reduce the horizontal dimension from a distance 2d+(d−d') to a distance 2d'. In this embodiment, the optical elements 46 of the horizontal OVRP 40 are reflective optical flats. FIG. 4b illustrates a side view of the positioning of two neighboring optical elements 50 in the vertical OVRP 44 to reduce the horizontal dimension from a distance 2d+(d−d') to a distance 2d'. In this embodiment, the optical elements 50 in the vertical OVRP 44 are also reflective optical flats.

Figure 5:
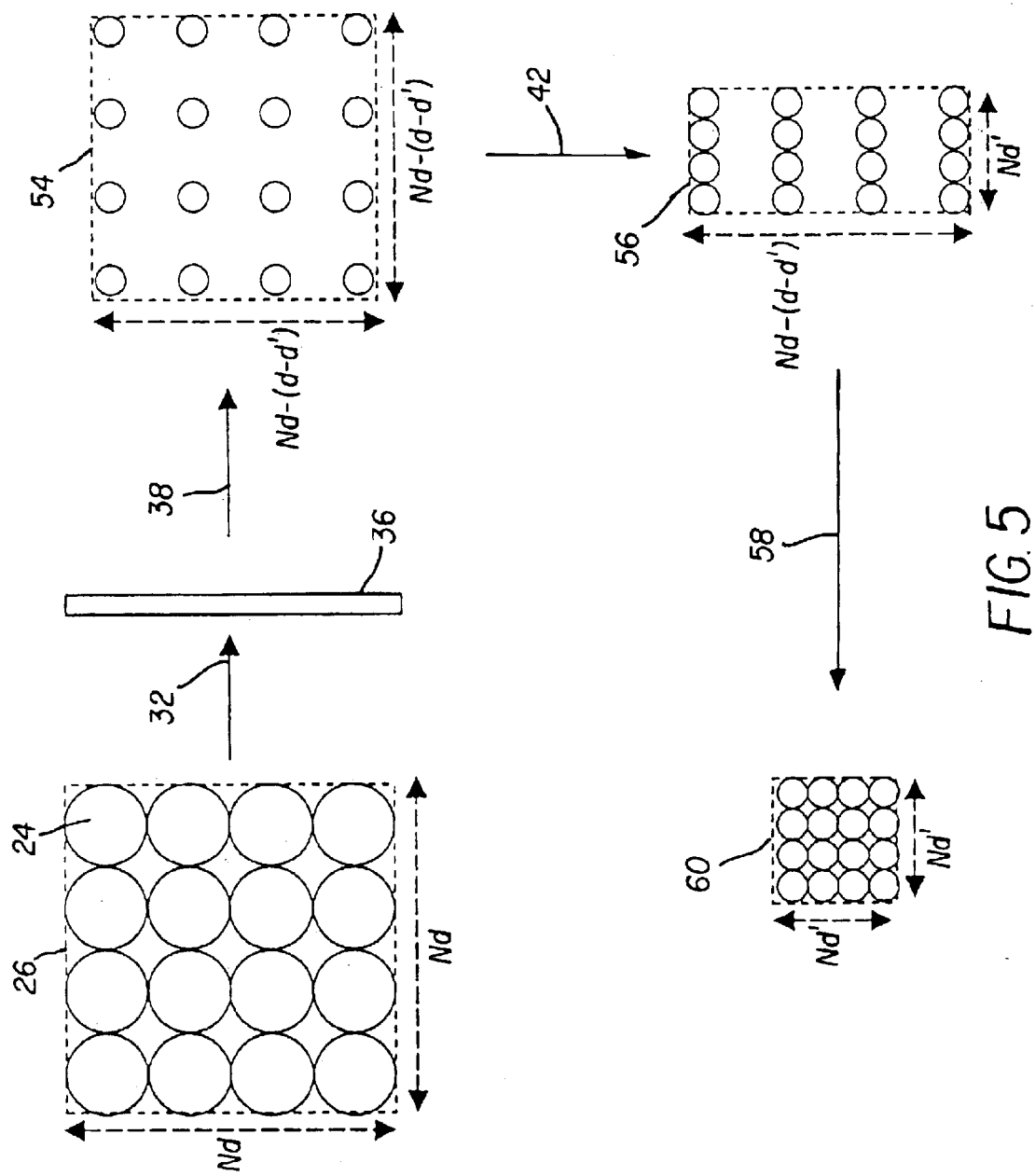
FIG. 5 is a schematic diagram illustrating the reduction of the area covering the exiting light bundles.

FIG. 5 illustrates the reduction of the area covering the exiting light bundles 32 using a horizontal OVRP 40 and a vertical OVRP 44. If there is no gap between the lens elements 24 in the horizontal and vertical direction, then the square array 26 of N number lens elements 24, each of diameter d, covers an area [Nd]×[Nd]. The diameter d' of each exiting light bundle 32 is smaller than the entrance aperture diameter d of the lens element 24. In one embodiment, the phase corrector 36 does not modify the diameter of the exiting light bundles 32 or the spacing between the exiting light bundles 32, thus the area 54 of the light bundles 38 entering the horizontal OVRP 40 is [Nd−(d−d')]×[Nd−(d−d')]. The horizontal OVRP 40 reduces the horizontal dimension from a distance Nd to a distance Nd'. Consequently, the area 56 of the light bundles 42 entering the vertical OVRP 44 is [Nd']×[Nd−(d−d')]. The vertical OVRP 44 reduces the vertical dimension from a distance Nd to a distance Nd' such that the area 60 of the light bundles 58 exiting the vertical OVRP 44 is [Nd']×[Nd']. The light bundles 58 exiting the vertical OVRP 44 are imaged by the beam combiner 62 as shown in FIG. 2. The beam combiner 62 is a means for combining all the exiting light bundles 58 from the array of lens elements 26 to form an image with resolution comparable to a single aperture having an equivalent aperture size respective to the array of lens elements 26. The image is recorded on a detector 64 (as shown in FIG. 2). The detector 64 can be any media capable of recording light.

Figure 6A:
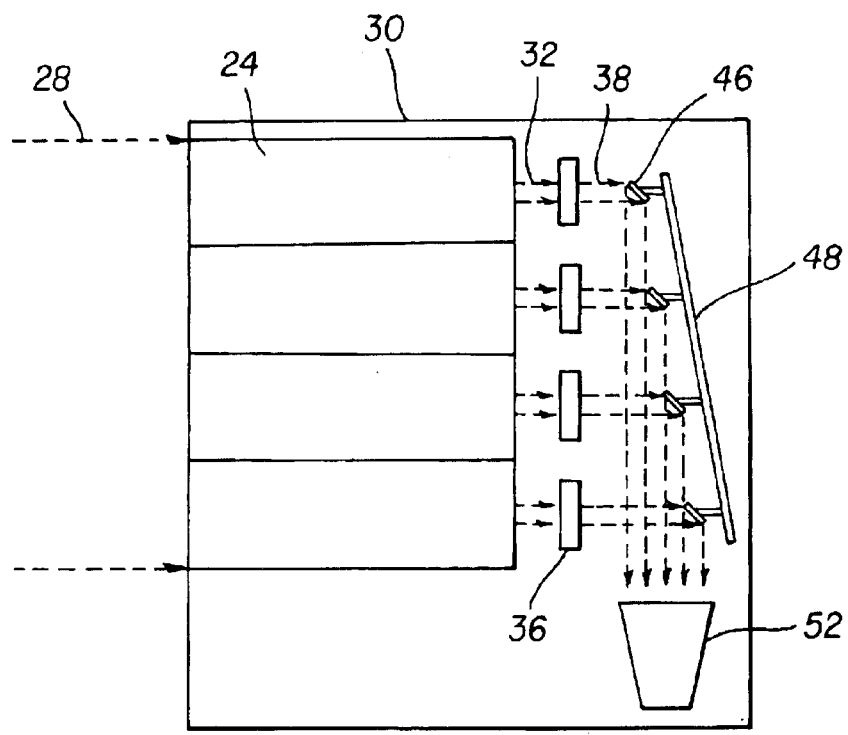
FIG. 6a is a schematic top view of the imaging system design of the present invention.
Figure 6B:
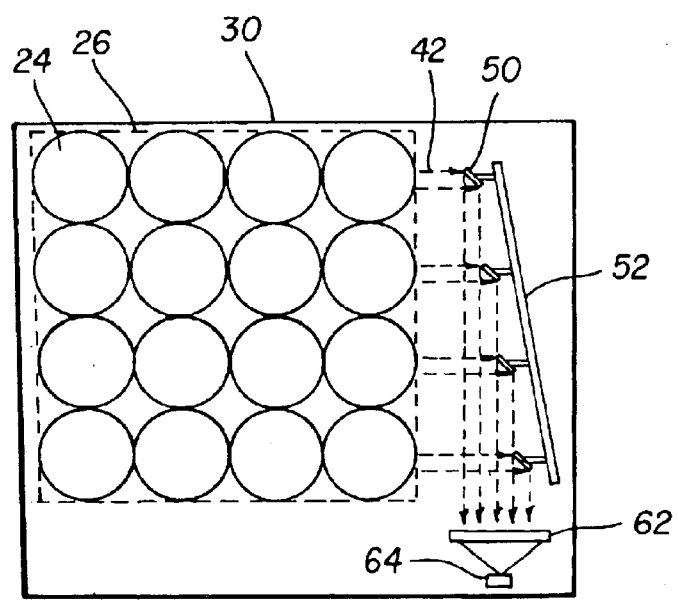
FIG. 6b is a schematic front view of the imaging system design of the present invention.

The horizontal OVRP 40 and the vertical OVRP 44 reduce the size of the beam combiner 62 necessary and allow the imaging system 30 of the present invention to be compact in volume. The beam combiner 62 can be located behind the array 26 to reduce overall width or beside the array 26 to reduce overall depth. FIGS. 6a and 6b illustrate one embodiment of the present invention that uses a horizontal OVRP 40 and the vertical OVRP 44 to minimize the depth of the imaging system 30. FIG. 6a is a schematic top view of the imaging system 30 and FIG. 6b is a schematic front view of the imaging system 30. The interaction between each of the numbered parts in FIG. 6a and FIG. 6b is the same as described for FIG. 2. The array 26 of lens elements 24 can be constructed such that it can be folded for further compactness when the entire array 26 of lens elements 24 is not being used for imaging.

In summary, a multiple aperture imaging system has been invented that uses an array of multiple lens elements to form an image with higher resolution than possible with each individual lens element; potentially the resolution will correspond to an aperture equivalent to the size of the array. The invention is designed to form a compact imaging system by reducing the overall volume of the captured light.

The invention has been described with reference to one embodiment. However, it is understood that a person of ordinary skill in the art can effect variations and modifications without departing from the scope of the invention.

PARTS LIST 24 lens element
26 array of lens elements
28 light entering lens element
30 imaging system
32 light exiting lens element
34 plurality of lenses comprising a lens element
36 optical phase corrector
38 light entering the horizontal OVRP
40 horizontal OVRP
42 light entering the vertical OVRP
44 vertical OVRP
46 optical elements comprising the horizontal OVRP
48 horizontal OVRP support structure
50 optical elements comprising the vertical OVRP
52 vertical OVRP support structure
54 area of the light bundles entering the horizontal OVRP
56 area of the light bundles entering the vertical OVRP
58 light exiting the vertical OVRP
60 area of the light bundles exiting the vertical OVRP
62 beam combiner
64 detector.

What is claimed is:

1. A multiple aperture imaging system comprising:
   a) an array of lens elements for capturing light and reducing a diameter of exiting light bundles, wherein the exiting light bundles exit from the array of lens elements;
   b) means for correcting optical phase of the exiting light bundles;
   c) means for reducing a total area of the exiting light bundles; and
   d) means for combining all the exiting light bundles from the array of lens elements to form an image with resolution comparable to a single lens element having an equivalent aperture size respective to the array of lens elements,
   wherein means for reducing the total area of the exiting light bundles includes first and second sets of reflective optical flats, arranged sequentially in space between the array of lens elements and the image, for sequentially compacting the exiting light bundles, initially in a first direction only and next in a second direction only, the second direction perpendicular to the first direction.

2. The multiple aperture imaging system claimed in claim 1, wherein the array of lens elements are arranged in a rectangular geometry.

3. The multiple aperture imaging system claimed in claim 1, wherein the means for reducing the total area of the exiting light bundles from the array of lens elements shifts placement of the exiting light bundles in a predetermined direction.

4. The multiple aperture imaging system claimed in claim 3, wherein the predetermined direction is selected from the group consisting of vertical, horizontal, diagonal, and radial.

5. The multiple aperture imaging system claimed in claim 4, wherein the means for reducing the total area of the exiting light bundles from the array of lens elements shifts the placement of the exiting light bundles both horizontally and vertically.

6. The multiple aperture imaging system claimed in claim 4, wherein the means for reducing the total area of the exiting light bundles from the array of lens elements shifts the placement of the exiting light bundles either horizontally or vertically.

7. The multiple aperture imaging system claimed in claim 1, wherein the array of lens elements are separated to create a sparse aperture.

8. The multiple aperture imaging system claimed in claim 1, wherein the telescopes are used as lens elements.

9. The multiple aperture imaging system claimed in claim 1, wherein a plurality of mirrors are used instead of the array of lens elements.

10. The multiple aperture imaging system claimed in claim 1, further comprising:
    an imaging sensor selected from the group consisting of an array of imaging capture elements, photographic film, charge-coupled devices, CMOS devices, and a spectrometer.

11. The multiple aperture imaging system claimed in claim 1, wherein the imaging system is foldable.

12. A method for forming an image with resolution equivalent to an array of lens elements, comprising the steps of:
    a) capturing light with the array of lens elements;
    b) directing the light exiting the array of lens elements into a plurality of exiting light bundles;
    c) reducing the plurality of exiting light bundles' diameters;
    d) correcting optical phase for the plurality of exiting light bundles;
    e) reducing the plurality of exiting light bundles' geometrical area; and
    f) combining each of the plurality of exiting light bundles from the array of lens elements to form an image with resolution comparable to a single lens element having an equivalent aperture size respective to the array of lens elements;
    wherein step (e) includes
    arranging, in spatial sequence, first and second sets of reflective optical flats, and
    first compacting the exiting light bundles in a first direction only, using the first set, and
    next compacting the exiting light bundles in a second direction only, using the second set, the second direction perpendicular to the first direction.

13. The method claimed in claim 12, wherein the array of lens elements is arranged in a rectangular geometry.

14. The method claimed in claim 12, wherein reducing an area of the exiting light bundles from the array of lens elements shifts placement of the exiting light bundles in a predetermined direction.

15. The method claimed in claim 14, wherein the predetermined direction is selected from the group consisting of vertical, horizontal, diagonal, and radial.

16. The method claimed in claim 15, wherein reducing the area of the exiting light bundles from the array of lens elements shifts the placement of the exiting light bundles both horizontally and vertically.

17. The method claimed in claim 15, wherein reducing the area of the exiting light bundles from the array of lens elements shifts the placement of the exiting light bundles either horizontally or vertically.

18. The method claimed in claim 12, wherein the lens elements are separated to create a sparse aperture.

* * * * *